S. Q. HARPER.
AGRICULTURAL IMPLEMENT.
APPLICATION FILED NOV. 12, 1919.

1,371,992.

Patented Mar. 15, 1921.
2 SHEETS—SHEET 1.

INVENTOR
Sylvester Q. Harper.

S. Q. HARPER.
AGRICULTURAL IMPLEMENT.
APPLICATION FILED NOV. 12, 1919.
1,371,992.
Patented Mar. 15, 1921.
2 SHEETS—SHEET 2.
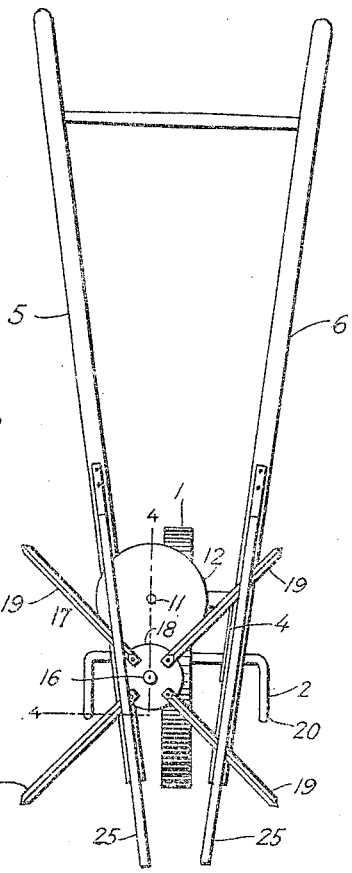
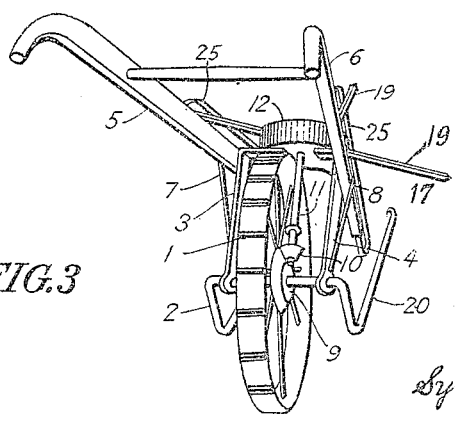
INVENTOR
Sylvester Q. Harper.

UNITED STATES PATENT OFFICE.

SYLVESTER Q. HARPER, OF FAYETTEVILLE, GEORGIA.

AGRICULTURAL IMPLEMENT.

1,371,992.

Specification of Letters Patent. Patented Mar. 15, 1921.

Application filed November 12, 1919. Serial No. 337,538.

*To all whom it may concern:*

Be it known that I, SYLVESTER Q. HARPER, a citizen of the United States, residing at Fayetteville, in the county of Fayette and State of Georgia, have invented certain new and useful Improvements in Agricultural Implements, of which the following is a specification.

This invention relates to improvements in cotton stalk knockers, and has for its object to provide means for knocking or uprooting cotton stalks from the ground.

A still further object of the invention is to provide a machine for uprooting cotton stalks, having a knocker geared to rotate at a rapid speed.

With the above and such other objects as may hereinafter more fully appear, I have invented the device illustrated in the accompanying drawings in which—

Fig. 2 is a front elevational view thereof.

Fig. 3 is a rear elevational view thereof.

Like reference characters indicate like parts throughout the following specification and in the several views in the drawings in which—

Figure 4:
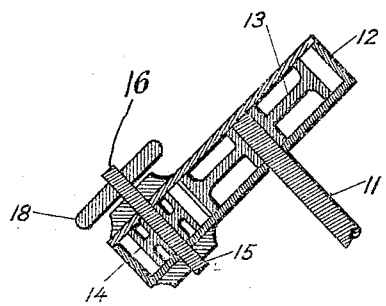
Fig. 4 is a section on line 4—4, Fig. 2.
Figure 1:
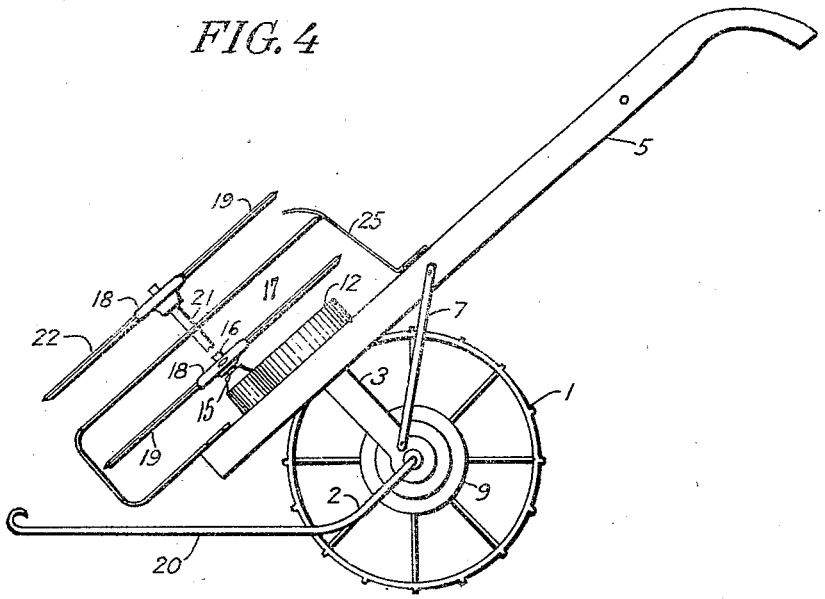
Figure 1 is a side elevational view of my invention.

1 is a tractor wheel mounted upon an axle shaft 2 between brackets 3 and 4 through the lower ends of which said shaft projects. To the upper ends of the brackets, plow handles 5 and 6 are secured at their lower ends, braces 7 and 8 connecting the central part of said handles to the lower part of said brackets. A bevel gear 9 is mounted upon the wheeel 2 and operates a bevel gear 10 on the lower end of the shaft 11. The upper end of said shaft projects into a case 12 mounted on the lower end of said handles. Fixed on the end of the shaft 10 in the case 12 is a gear 13 which operates a pinion 14 also mounted in the case 12 and upon a shaft 15 which is mounted in the walls of and projects through said case.

Fixedly mounted on the upper end 16 of the shaft 15 is a knocker 17 which consists of a hub 18 from which projects a series of knocker arms 19. A draft bar 20 has its inner end bent at right angles forming an axle 2 whereby the machine is drawn usually by one horse. The rotation of wheel 1 through the gearing 9, 10, 13 and 14 rotates the knocker 17 at a rapid rate, so that the arms 19 coming in contact with cotton stalks will knock them out of the ground. Shaft 15 may be extended as at 21 to receive another knocker 22 if found desirable. As the beam 20 is pivoted relative to the wheel 2, its position relative to the ground may be instantly adjusted so as to adjust the lower end of the knocker arms 19 to knock the stalk high or low, as desired, or, raise the arms over obstacles that may be in the path of the machine. If desired two of these machines may be connected side by side in order to operate upon two rows of stalks simultaneously.

Figure 5:
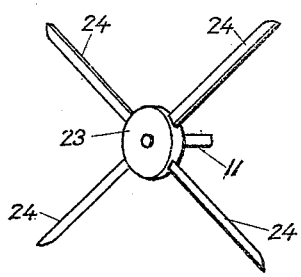
Fig. 5 is a perspective view of a modification.

In Fig. 5 I show a slight modification of the invention, which consists of a cutter member embracing the hub 23, having a series of blades 24. This cutter may be substituted for the knocker 17 on the shaft 15 for the purpose of cutting corn or other stalks. 25 is a guard for the knocker.

Having now described my invention that which I claim to be new and desire to procure by Letters Patent is—

1. The described device including a tractor having inclined handles, a shaft operated by the tractor and knocker arms parallel with the handles and driven by the shaft.

2. A device as described consisting of a tractor wheel, inclined handles connected therewith, an inclined shaft driven by the wheel and rotatable members operated by the shaft.

3. A device as described consisting of a tractor wheel, inclined handles connected therewith, an inclined shaft driven by the wheel and rotatable members operated by the shaft, said members being arranged in parallelism with the handles.

4. A machine of the character described embracing a tractor wheel, a shaft driven thereby, a rotatable member, and handles for operating the wheel, said handles and member being inclined.

5. A machine of the character described embracing a tractor wheel, a shaft driven thereby, a rotatable member, and handles for operating the wheel, said handles and member being inclined, and in parallel relation.

6. A machine of the character described embracing a tractor wheel, a shaft driven thereby, a rotatable member, and handles for operating the wheel, said handles and member being inclined, and in parallel relation, said member including cutter arms.

7. A machine of the character described including a tractor wheel, a shaft therefor, brackets mounted on said shaft, handles connected to said brackets and a rotatable member mounted above said handles, said handles and member being inclined and in parallel relation.

8. A machine of the character described including a tractor wheel, a shaft therefor, brackets mounted on said shaft, handles connected to said brackets and a rotatable member mounted above said handles, said handles and member being inclined and in parallel relation, said member consisting of a hub having radially disposed arms.

9. A machine of the character described including a tractor wheel, a shaft therefor, brackets mounted on said shaft, handles connected to said brackets and a rotatable member mounted above said handles, said handles, and member being inclined and in parallel relation, said member consisting of a hub having radially disposed arms, said arms consisting of cutter blades.

In testimony whereof I affix my signature in the presence of two witnesses.

SYLVESTER Q. HARPER.

Witnesses:
A. L. MATTHEWS,
D. B. BEALOCK.